Aug. 19, 1952     J. F. SCHOEPPEL ET AL     2,607,231
GYROSCOPE
Filed March 29, 1948     3 Sheets-Sheet 1
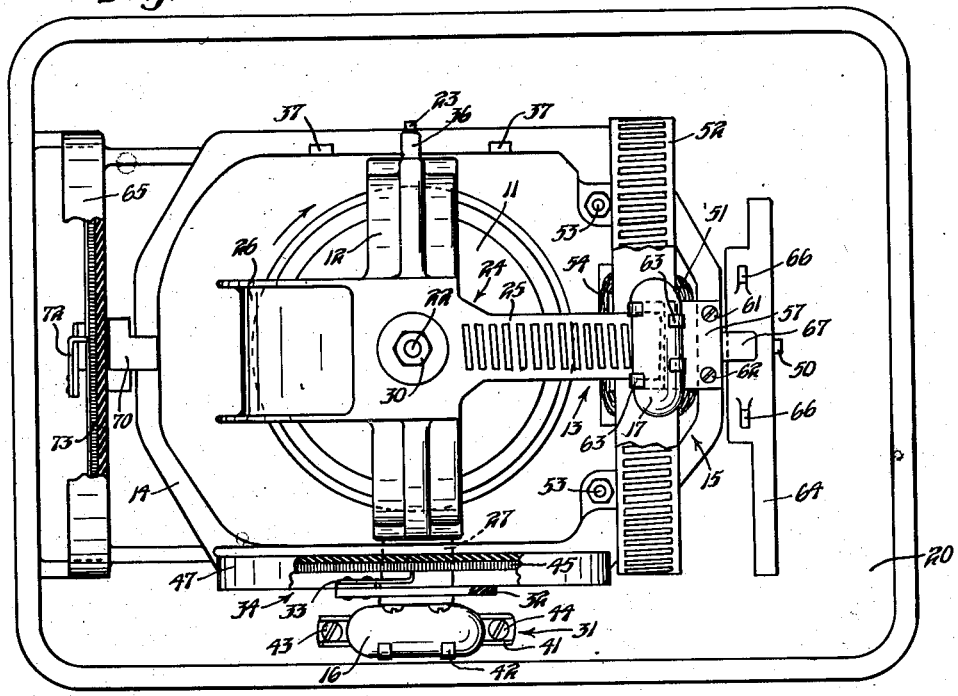
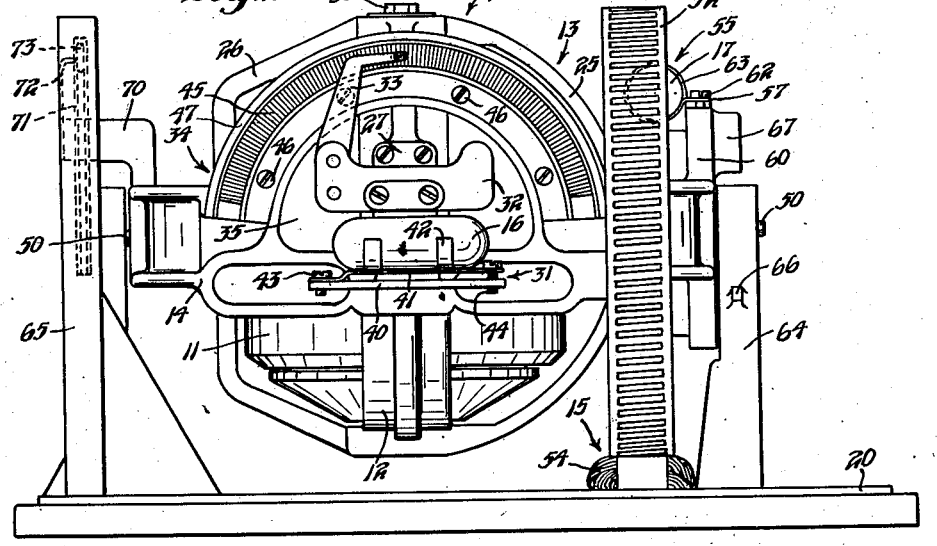
Inventors
JOHN F. SCHOEPPEL
WAYNE A. STONE
By George H. Fisher
Attorney

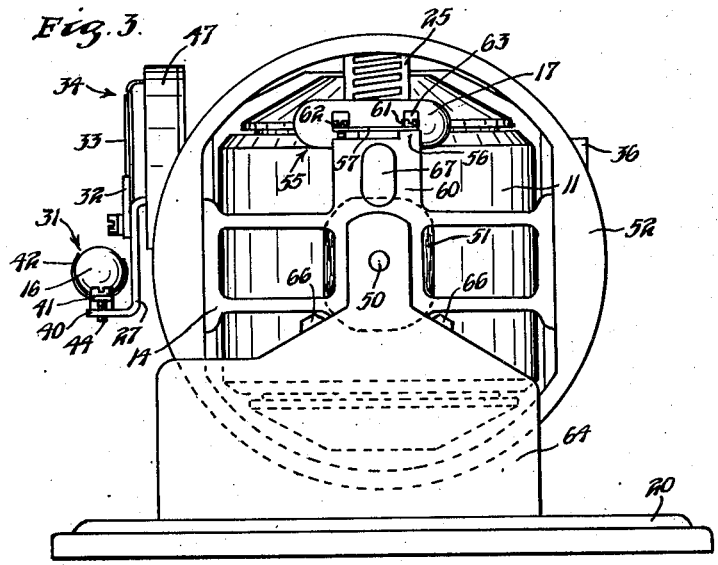
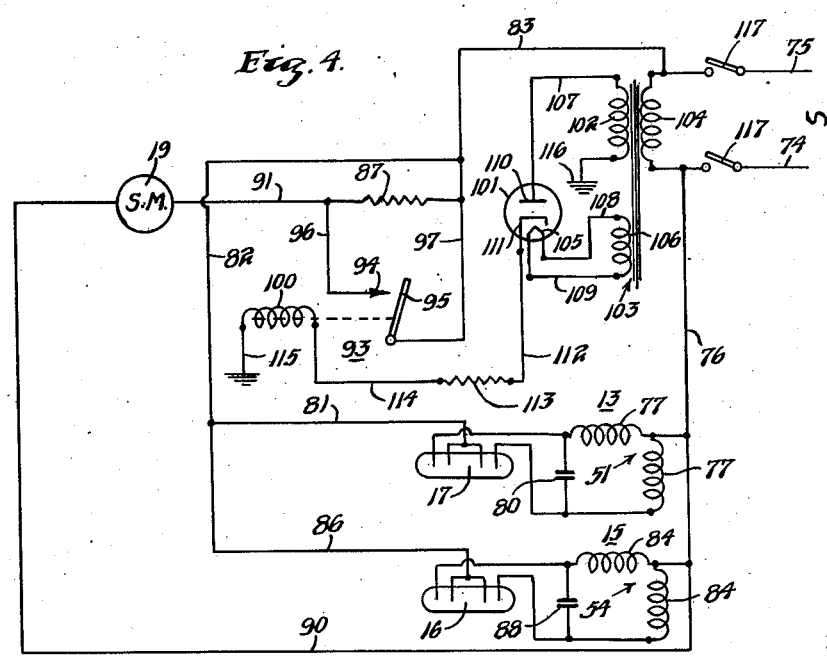

Aug. 19, 1952     J. F. SCHOEPPEL ET AL     2,607,231
GYROSCOPE
Filed March 29, 1948     3 Sheets-Sheet 3
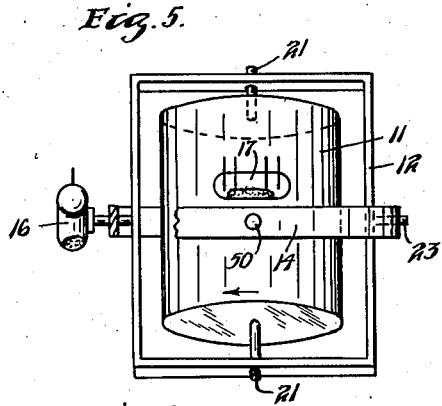
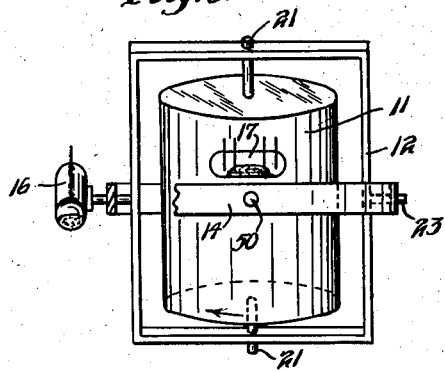
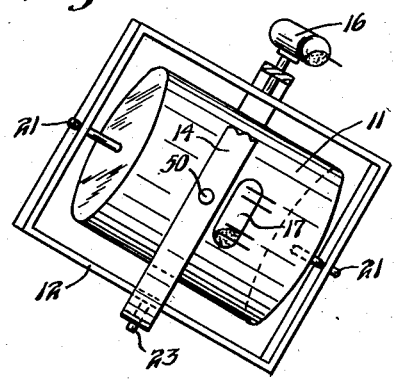
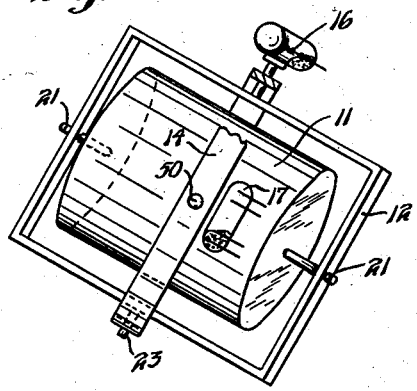
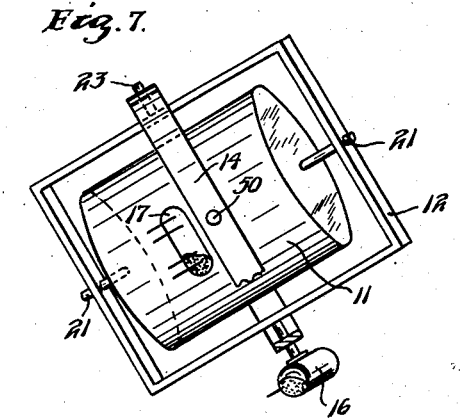
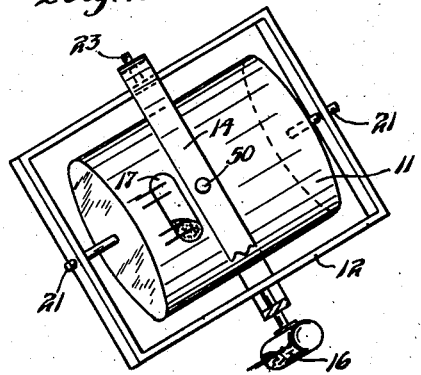
Inventors
JOHN F. SCHOEPPEL
WAYNE A. STONE
George H. Fisher
Attorney Patented Aug. 19, 1952

2,607,231

UNITED STATES PATENT OFFICE 2,607,231

GYROSCOPE

John F. Schoeppel, Grand Rapids, Mich., and Wayne A. Stone, St. Louis Park, Minn., assignors to Minneapolis-Honeywell Regulator Company, Minneapolis, Minn., a corporation of Delaware Application March 29, 1948, Serial No. 17,698

12 Claims. (Cl. 74—5.47)

The present invention relates to gyroscopes and more particularly to improvements in a three degree of freedom gyroscope when used as a vertical gyroscope.

Vertical gyroscopes and erection means for the same are old in the art of gyroscopic devices. The erection of such gyroscopes must be controlled by gravity sensitive control devices in order that a true vertical operating position be maintained by the rotor of such a gyroscope. In their earliest forms, such instruments or devices had limited freedom of displacement since the objects to be controlled, particularly ships and aircraft upon which such devices were mounted, were seldom if ever subjected to displacement in either the roll or pitch direction through angles which approached the limit position of the vertical or gravitational axes during normal operation. With the advent of high performance military and commercial aircraft in which the range of attitude positions assumed during normal operating conditions were greatly increased, the need arose for automatically controlling such aircraft or other devices during operating conditions, and it became necessary to increase the permitted range of relative angular displacement of such gyroscopic devices. Thus in the modern autopilot, in which the present type of gyroscopic device is generally used, it became necessary to follow through and control the attitude of an aircraft up to and exceeding the position of vertical bank and vertical dive or climb. The problem here was not that of erecting the gyroscope in such attitudes since the gyroscope generally remained erect if it were operating in its normal vertical position and the torque motors or erection means maintained that position of the gyroscope as the mounting or plane's attitude was displaced relative to the direction of the gravitational force. The problem which did arise with such wide ranges of displacement was the fact that upon starting, the gyroscope rotor was generally displaced relative to its supporting structure in such a manner that the operation of the gravitational type control device controlling the operation of the erecting motors was reversed thereby rendering the erection motors ineffective to move the gyroscope rotor to its normal vertical operating position. Attempts to overcome this defect by the use of auxiliary erecting devices or by unbalancing the gyroscope to assume a vertical position were not completely satisfactory since it required the addition of weight and equipments to an already complex structure thereby reducing the speed of erection and sensitivity of such devices. The present invention overcomes this defect and provides a simple method of vertical gyroscope erection as the gyroscope is started from a standstill condition during which period one of the normal erection means is usually rendered ineffective without requiring any additional structure to the gyroscope or without impairing its operation in any manner.

It is further an object of this invention to provide a simple and effective means of rapidly erecting a vertical gyroscope.

It is also an object of this invention to provide an improved method of erecting a vertical gyroscope during starting operation when the operation of one of its normal erecting means is reversed and inoperative due to displacement of the rotor and its supporting ring beyond the normal to the vertical gravitational axis which method includes decreasing the acceleration of the rotor to decrease its back torque when the rotor is in a predetermined position and allowing the remaining erection means to erect the gyroscope to its normal operating position as the rotor comes up to its operating speed.

It is still further an object of this invention to provide a method of erecting a vertical gyroscope from a deenergized position whose erecting means are controlled by a gravitational type control device in which the operation of one of the control devices is reversed upon starting.

It is an object of this invention to provide a simple method of reducing the acceleration of the rotor of the gyroscope during starting operation.

Various other objects, advantages, and features of novelty which characterize our invention become apparent from a study of the following specification and drawings wherein:

Figure 1 is a top plan view of the vertical gyroscope;

Figure 2 is a front elevation view of the gyroscope;

Figure 3 is an end elevation view of the gyroscope;

Figure 4 is a schematic view of a circuit for controlling the erection of the vertical gyroscope as described in the preferred embodiment of the invention;

Figure 5 is a schematic end elevation view of the gyroscope with the rotor and its supporting ring and control device tilted on the gimbal ring in a counterclockwise direction as viewed from the front;

Figure 6 is a schematic elevation view of the structure shown in Figure 5 with the exception that the entire structure has been rotated clockwise 120° about the support axes;

Figure 7 is a schematic elevation view of the structure shown in Figure 5 with the exception that the entire structure is rotated 120° counterclockwise about the support axis of the gyroscope.

Figure 8 is a schematic end elevation view of the gyroscope with the rotor and its supporting ring positioned clockwise about the support ring axis as viewed from the end of this axis at which the control device is located.

Figure 9 is a schematic view of the structure of Figure 8 with the exception that the structure is positioned about the support axis of the gyroscope 120° in a clockwise direction.

Figure 10 is a schematic elevation view of the structure of Figure 8 with the exception that the structure is positioned 120° counterclockwise about the support axis of the gyroscope from that shown in Figure 8.

The vertical gyroscope disclosed in Figures 1, 2, and 3 comprises a rotor 11, a support ring 12, a roll erection motor 13 for precessing a Cardan or gimbal ring 14, a pitch erection motor 15 for precessing the support ring 12, a control device 16 mounted on the support ring 12 for controlling the energization of the pitch erection motor 15, a control device 17 mounted on a gimbal ring 14 for controlling the energization of the roll erection motor 13, and a supporting or mounting structure 20.

Rotor 11, as shown in the Figures 1, 2 and 3, is a cylinder with its axis 21 (shown only in Figures 5-10) extending from the ends thereof in a vertical direction and pivoted to the support ring 12 in bearings 22 contained in the support ring 12. Rotor 11 is energized from an electric motor spinning means 19 as shown only in schematic Figure 4. An electric motor is shown here for simplicity but it is to be understood that any motivating means, such as an air motor, can be used as long as it can be controlled as hereinafter disclosed. The electrical connections to the rotor's spinning means 19 and the necessary slip rings and pivotal lead connections to the stationary support mounting 20 are omitted in the drawings in an effort to simplify the disclosure since such features are old and do not add to the present invention. Support ring 12 includes a pair of pins or shafts 23 by which support ring 12 is mounted to the gimbal ring 14 and is free to rotate. The axis formed by these support ring shafts 23 passes through the center of gravity of the total structure supported thereby which includes the rotor 11 and its spinning means 19, the support ring 12 and a squirrel cage rotor ring 24 of the roll erection motor mounted on support ring 12. Squirrel cage ring 24 is fastened to the support ring 12 at the points where the bearings 22 of the support rings for the rotor shaft or axis 21 are located. This squirrel cage ring includes a semicircular section containing the squirrel cage rotor element 25 which is the rotor for the roll erection motor. The remaining half of the ring is a U-shaped channel member 26 which conforms to and fits around the length or the side of the rotor 11. As shown in Figures 1 and 2 this squirrel cage ring 24 is shown for simplicity as a continuous member which is permanently connected to the support ring 12 by a nut 30 which threads one end of bearing 22. The U-shaped channel member or section 26 although wider than the squirrel cage rotor section 25 has the same mass and serves to counterbalance the weight of the rotor section 25 as well as provide a more rigid construction. In order that the erection motor may apply torque to the support ring 12 in a direction normal to its plane, the support ring 12 and squirrel cage ring 24 are positioned perpendicular to one another.

Also included on the support ring 12 is the bracket 27 which is attached slightly above one shaft 23 of the support ring 12 to be movable therewith. Bracket 27 has mounted on it, at the extremity opposite the one attached to the support ring 12, control device 16 or mercury switch, its mounting assembly 31 and an insulated block 32 which carries on it the wiper 33 of a potentiometer 34. Bracket 27 extends through an opening 35 in the gimbal ring 14 in such a manner that mercury switch 16 mounted on the end thereof and also the potentiometer wiper 33 is positioned outside of gimbal ring 14. Opening 35 in the gimbal ring 14 is semicircular and sufficient to permit movement of the bracket 27 and the apparatus mounted thereon through approximately 160°. Support ring 12 also carries a stop arm 36 located above the opposite end of shaft or axis 23 of the support ring 12 which arm contacts fixed stops 37 located on the gimbal ring 14. Stops 37 are positioned so that a maximum rotation of the support ring of 160°, or 80° to either side of its central or neutral position, is permitted. Thus mercury switch 16 can be positioned approximately 80° either side of its neutral position and potentiometer wiper 33 is free to move through an arc of approximately 160°.

Mercury switch assembly 31 includes arm 40, a flexible adjusting member 41 with clamps 42 attached thereto to clasp the mercury switch 16 and secure it to the flexible member 41. Flexible member 41 is attached at one end to arm 40 by a screw 43 and is bent and offset from the arm to enable adjustment of the position of the switch 16 relative to the arm 40. A nut and bolt connection 44 is made through the offset end of the adjustable member 41 and arm 40 to provide a means of making this adjustment.

Potentiometer wiper 33, which is mounted on insulating block 32 attached to bracket 27, contacts and rests on a potentiometer winding 45 which is mounted on the gimbal ring 14. Winding 45 is annular shaped and is attached by screws 46 to a similarly shaped portion 47 of the gimbal ring 14 which surrounds the semicircular opening 35 through which the bracket 27 extends. The connections to wiper 33 and winding 45 are omitted here for simplicity and are not shown in the circuit of Figure 4 since they do not comprise a part of the invention disclosed herein. The potentiometer assembly is shown here merely to indicate one method of utilizing the effect of displacement of the gyroscope in which such a device is energized and supplies a signal to a controlling circuit of an autopilot system in proportion to the displacement of the rotor about the pitch axis of the gyroscope or that axis formed by engagement of support shafts 23 with the gimbal ring 14.

Gimbal ring 14 is generally rectangular in shape and contains bearings (not shown) into which shafts 23 of support ring 12 extend for mounting the support ring 12 and its associated structure and providing a means for allowing the support ring and its structure to be pivoted. Gimbal ring 14 similarly has shafts 50 by which said ring is mounted to the main supporting structure 20 of the gyroscope. The axes of these shafts 50 lie in the same plane as the bearings of the gimbal ring, and shafts 23 of the support ring 12 which fit into these bearings and are positioned perpendicular to the latter in such a manner that if projected the axis would pass through the axis 21 of the rotor. Attached to one end of gimbal ring 14 on its inside perimeter and adjacent to one of the shafts 50 is the stator field member 51 for roll erection motor 13. Field structure 51 is positioned to move with gimbal ring 14 and consequently its rotor 25 which is attached to support ring 12 also moves with it as the gyroscope is displaced about shafts or axes 50 of the gimbal ring, commonly called the roll axis of the gyroscope. In this manner stator 51 and rotor 25 of squirrel cage rotor ring 24 of the roll erection motor 13 move simultaneously about the roll axis and are always in operative relationship with one another. Squirrel cage rotor portion 25 of erection motor 13 is, however, free to rotate about the pitch axis of the gyroscope formed by shafts 23 of the support ring relative to the gimbal ring 14.

Squirrel cage rotor 52 of pitch erection motor 15 is annular in form and is attached at one end of the gimbal ring 14 in a plane perpendicular to that of the gimbal ring by screws 53 to move with gimbal ring 14. A stator field member 54 of the pitch erection motor 15 is positioned on and attached to the frame structure 20 being stationary with respect to the remaining parts of the gyroscope. Also carried at one end of gimbal ring 14 is the mercury switch assembly 55 which assembly includes the mounting lug 56, adjustable member 57 and the mercury switch 17. Lug 56 is attached to a projecting portion 60 of the gimbal ring 14 and adjustable member 57 is attached to said lug by screw 61 with a portion of the adjustable member being offset from portion 60 to provide for the adjustment. The nut and bolt 62 connection extending through adjustable member 57 provides a means for adjusting the position of the mercury switch which is held by clamps 63, which form a part of the adjustable member and securely mount the switch.

All electrical connections between the mercury switches 16 and 17 and erection motors 13 and 15 and to the energizing source, have been omitted in all the drawings except Figure 4, for simplicity in disclosure. Any method of connection such as slip rings can be used. Figure 4, however, is merely a schematic circuit drawing of the control circuit for the erection motors and the spinning motor of the gyroscope.

Projecting from the main support 20 of the gyroscope are two upright support members 64, 65 which contain the bearings (not shown) for the gimbal shafts 50 and provide a means for mounting and pivoting the same. Upright support member 64 which receives one of the shafts 50 of gimbal ring 14 at which end the roll and pitch erection motors 13 and 15 are located contains two upraised projections or stops 66 which are contacted by and limit the movement of a projecting lug 67 carried by the projecting portion 60 of gimbal ring 14 and located adjacent to the mercury switch assembly 55 carried by that projecting portion. These stops, as best illustrated in Figure 3, permit rotation of the gimbal ring 14 and the remaining gyroscope structure supported thereon a total of 240°, or 120° to either side of a neutral position wherein the plane of the axis of the rotor is perpendicular to the support 20.

At the other end of gimbal ring 14 is attached an L-shaped arm 70 projecting upward from the ring 14 and then paralleling the shaft 50 to project through an annular shaped opening 71 in the upstanding support member 65 of main support 20. The free end of this L-shaped arm 70 carries a potentiometer wiper 72 which moves with the gimbal ring 14. Mounted on upright support member 65 is an annular shaped potentiometer winding 73 which is concentric with the opening 71 in support 65 which is attached thereto by any suitable means such as screws (not shown). Wiper 72 is positioned in contact with winding 73 and moves with gimbal ring 14 over approximately a 240° range along which winding 73 extends. Wiper 72 and winding 73 are shown here only to indicate means of utilizing the effect of the displacement of the gyroscope about its roll axis and for this reason the connections to these units are also omitted here since it is not embodied in this invention.

In Figure 4 are shown the circuits which control the erection system and the energization of the rotor for the vertical gyroscope which circuits are energized from a common source shown as conductors 74, 75. Connected to one side of line 74 by conductor 76 are field structures 51, 54 of roll erection motor 13 and pitch erection 15 respectively. Field structure 51 of roll erection motor 13 contains two windings 77 which are connected in common at one end to conductor 76. Across the other extremities of winding 77 is connected condenser 80 in the well known manner of capacitor or split phase motors. Condenser 80 is not shown in Figures 1, 2, and 3 but such units are usually mounted on the base structure 20 of the gyroscope. The ends of windings 77 to which condenser 80 is connected extend to opposite terminals or contacts not common with one another of mercury switch 17 which control device is mounted on and movable with the gimbal ring 14. The common electrodes of this single pole double throw mercury switch are connected by means of conductors 81, 82, and 83 to the opposite side of the source of power or line 75. The energizing circuit for roll erection motor 13 is therefore as follows: line 74 to conductor 76, windings 77, condenser 80, to one or the other uncommon contacts of mercury switch 17, from common electrodes of the mercury switch 17 to conductor 81, conductor 82, and conductor 83 to line wire 75. Since only one pair of the contacts of the mercury switch 17 can be made at a particular instance, one of the motor windings 77 will be connected directly across the energizing source and the other winding 77 will be connected in series with condenser 80 and in parallel with the first named motor winding which is, in effect, the line winding. The flux created by these two field windings 77 will be displaced in phase from one another producing a rotating flux field which acts with the rotor to cause a certain direction of rotation or applied torque. Such torque or rotation is reversed in direction when the opposite pair of contacts of mercury switch 17 are made and the condenser 80 is connected in series with the opposite named field winding 77 from that first recited. Field structure 54 of the pitch erection motor similarly comprises two windings 84 one end of each being connected in common and said common connection being connected to line wire 74 by conductor 76. Condenser 88 is connected across the opposite ends of these windings 84 which in turn are connected to terminals or contacts, not common to one another, of mercury switch 16 which is mounted on support ring 12. Condenser 88 has also been omitted from Figures 1, 2, and 3 for simplicity but is usually mounted on base structure 20. The common electrodes or terminals of the mercury switch 16 are connected by conductors 86, 82, and 83 to the opposite side of the source of power or line 75. This provides an energizing circuit for the pitch erection motor as follows: line wire 74, conductor 76, windings 84, condenser 88, to one or the other uncommon contacts of mercury switch 16, the common electrodes of mercury switch 16 through conductor 86 to conductor 82, and conductor 83 to line wire 75. In a manner similar to that in which switch 17 controls the circuit to windings 77, the contacts of the mercury switch 16 control the circuit in which the condenser 88 is connected so as to connect it in series with one or the other of the motor windings 84, and hence the direction of the rotating flux field in the field structure which governs the direction of applied torque.

Rotor motor or spinning means 19 of rotor 11 is energized from the source of power as follows: line wire 74, conductor 76, conductor 90, spinning means 19, conductor 91, load resistor 87, and conductor 83, to line wire 75. Spinning means 19 is schematically shown in Figure 4 as an electric motor but it is to be understood that other suitable motivating means, such as an air motor having similar torque characteristics could be employed, which can be controlled through a device electrically energized such as is shown here in Figure 4 as a spinning means 19 to control the acceleration of the rotor. A load resistance 87 in the above described circuit is designed to reduce voltage and current flow applied to spinning means 19 of rotor 11 and thereby control the rate of acceleration of the motor. Load resistor 87 is shorted out of the energizing circuit of the spinning means by operation of relay 93, not shown in Figures 1, 2, 3, the contacts 94, 95 of which when closed establish a shorting circuit through conductors 96, 97 to the conductors 91 and 83. Thus when the contacts 94, 95 of relay 93 are closed spinning means 19 will be energized in the following circuit: line wire 74, conductor 76, to conductor 90, to spinning means 19, conductor 91, to conductor 96, to fixed contact 94 of relay 93, from movable contact 95 of relay 93 to conductor 97, and from conductor 83 to line wire 75. Relay 93 having an operating coil 100 is energized through a thermionic tube 101 from the secondary winding 102 of transformer 103, the primary winding 104 of which is energized from lines 74, 75. Thermionic tube 101 comprises anode 110, cathode 111, and heater 105, and acts as a time delay device since it does not become conductive immediately upon energization until heater 105 is warmed up. Until tube 101 is conductive, relay coil 100 remains deenergized and load resistance 87 remains in the energization circuit of the spinning means 19 as described above. Heater 105 of tube 101 is energized from an independent secondary winding 106, transformer 103, through conductors 108, 109. Relay 93 is energized through the circuit as follows: secondary winding 102 of transformer 103, conductor 107, anode 110 of tube 101, cathode 111 to conductor 112, resistor 113 to conductor 114, relay coil 100, and ground conductor 115 to ground conductor 116 of secondary winding 102. The energizing circuits for the spinning means 19 and direction motors 13 and 15 are isolated from the source by disconnect switches 117 in lines 74, 75.

Under normal operation, the gyroscope functions in a conventional manner. With switches 117 closed, spinning means 19 and roll and pitch erection motors 13 and 15 are energized through the control of the mercury circuits described above. Spinning means 19 will be normally energized with load resistor 87 shorted out of the circuit since thermionic tube 101 provides a time delay in the energization of the relay 93 only during starting operation when the power is first applied to said tube. Rotor 11 when once erected to a vertical position after starting generally maintains this vertical position during normal operation with the exception of slight amounts of precession due to friction of the gyroscope or its unbalance which are continually being corrected by the erection motors. Movement of the rotor 11 about the pitch axis will cause mercury switch 16 mounted on support ring 12 to make one or the other of a set of contacts which control the energization of the pitch erection motor 15. Depending upon which direction the rotor 11 is tilted about the pitch axis, and consequently which set of contacts of mercury switch 16 are made, the field 54 of pitch erection motor 15 will be energized to apply torque in a given direction to its respective rotor 52 and consequently the gimbal ring 14 attached thereto. The torque applied does not cause rotation of the gimbal ring 14 except when the erection motor 13 or support ring 12 is offset to its stops or limiting position as will be later noted, but rather causes precession of the support ring 12 in a direction to counteract the degree of offset or displacement. In the same manner, when the gyroscope is displaced about its roll axis, that is about the shafts 50 for the gimbal ring 14, mercury switch 17 mounted on gimbal ring 14 will have one or the other of its said contacts made. These contacts control the energization of the roll erection motor 13 and torque will be applied to support ring 12 and rotor 25 attached thereto from the field structure 51 in such direction so as to cause gimbal ring 14 to precess in a direction to counteract the displacement of gimbal ring 14 about the roll axis and return gyroscope 10 to the vertical position. Here also, rotor 25 of the roll erection motor 13 which is attached to support ring 12 does not actually rotate but merely applies a torque to the support ring 12 except when gimbal ring 14 is displaced against its limit stops, as will be later noted.

The gyroscope is mounted for operation with its base or support structure 20 fastened to any desired unit with which it is to be used, such as an aircraft. The mounting position must be such that the mercury switches 16 and 17 or, generally, the gravity sensitive control devices, may have a normally neutral position. For the present gyroscope this normal position will be such that the base structure is mounted in a normally horizontal plane. As the unit or aircraft has been displaced in its attitude, the relationship between the base 20 and the gravitational axis will be similarly displaced. Rotor 11, however, remains in a true vertical position due to the operation of the gravity sensitive control devices 16, 17 and the erection motors 13, 15 or the precessing means for the gyroscope. The potentiometers which are operated from the gimbal and support rings are similarly displaced from their relative neutral position and provide a means of supplying a signal to indicate this degree of displacement of the gyroscope about its respective axes which signals are usually used to control or correct the attitude of the unit or aircraft in a manner well known in the art of autopilots and similar systems. Such systems, however, are beyond the scope of the present invention and are omitted here.

The erection of the gyroscope upon starting or energization is the primary motive of the present invention. To explain this operation, the actual effect of displacement of the gyroscope or rotor 11 under normal operation upon the roll and pitch erection motors 13, 15 will be considered with respect to the ends of the roll and pitch axes, that is the support ring 12 and gimbal ring 14 axes, at which the respective mercury switches 16, 17 or gravity sensitive control devices are located. In the present gyroscope, the rotor 11 is designed to spin in a clockwise direction about its respective axes as viewed from the top or plan view of Figure 1. Unless the rotor is so displaced against the stops of the gimbal or Cardan 14 and support rings 12, the torque applied from the respective erection motors 13, 15 will cause movement of the opposite ring or erection motor in the following manner. With displacement of the support ring 12 from vertical counterclockwise, as viewed in Figure 2, the pitch erection motor 15 will be energized to provide a clockwise torque to its rotor 52, as reviewed in Figure 3, attached to gimbal ring 14 to cause precession of support ring 12 and its rotor 25 in a clockwise direction. Conversely if the displacement of support ring 12 is clockwise, the torque applied to the rotor 52 of pitch erection motor 15 mounted on gimbal ring 14 will be counterclockwise causing support ring 12 to precess counterclockwise. Likewise when the gyroscope is displaced from the vertical about its roll axis, that is the gimbal ring, in a clockwise direction, as viewed in Figure 3, to make the contacts of its mercury switch 17, the roll erection motor 13, rotor 25 of which is attached to support ring 12, will be energized to apply a torque to support ring 12 in a clockwise direction causing gimbal ring 14 to precess in a counterclockwise direction. In the same manner when the gyroscope is displaced about its gimbal or Cardan axis in a counterclockwise direction, roll erection motor 15 will be energized to apply torque to support ring 12 in a counterclockwise direction causing gimbal ring 14 to precess in a clockwise direction.

Should the gyroscope be in position against its limit stops on the support ring 12 or gimbal ring 14, the precession would not take effect and the precessing function of the gyroscope would no longer be effective. Under these conditions, the respective erection motor which is so energized to apply torque and provide the precession acts as a common induction motor and moves its respective rotor in the direction to which torque was applied.

In a vertical gyroscope, gravity sensitive control devices are employed to sense displacement of a gyroscope away from a true vertical position. Under normal operation the gyroscope is not displaced over 90° in either direction about its roll or pitch axes and, as a result, the gyroscope continues to operate in its conventional manner. With the permissive range of movement of such a gyroscope about its respective axes increased beyond this point, it is possible for the operation of the gravity type control devices to reverse when the range of displacement of 90° to either side of the neutral or vertical position occurs. Such is usually the position assumed by the rotor of the gyroscope when the gyroscope has been deenergized.

The Figures 5, 6, 7, 8, 9, and 10 are schematic sketches of the rotor 11, support ring 12, and gimbal ring 14 with their respective control devices 16, 17 as viewed from the end of the gimbal axes or shaft 50 where the mercury switch 17 of the gimbal ring 14 is located. Figure 5 shows the gimbal ring in its neutral position with its control device 17 inoperative. Support ring 12 and its mercury switch 16 are displaced slightly counterclockwise (as viewed from the left) about the pitch axis so that one set of the mercury switch contacts are made. Figure 6 shows how the operation of mercury switch 16 which is attached to the support ring is reversed as the gyroscope structure is rotated approximately 120° clockwise about the gimbal axis from the position of Figure 5. The opposite set of contacts of the mercury switch 16 are made as the gimbal ring 14 passes a point of 90° displacement from the neutral or level position. Similarly, Figure 7 shows how the operation of the control device 16 of the support ring 12 is reversed from the condition of Figure 5 when the gyroscope structure is displaced 120° counterclockwise from the position of Figure 5 with the support ring 12 remaining in the same relative position to the gimbal ring 14. Figure 8 is similar to Figure 5 with the exception that support ring 12 and its mercury switch or gravity sensitive control device 16 is tilted clockwise (as viewed from the left) about the pitch axis while gimbal ring 14 is in a level or neutral position. Figure 9 shows how the operation of the gravity sensitive control device or mercury switch 16 is reversed from the condition of Figure 8 when gyroscope structure or the gimbal ring 14 is displaced 120° about its respective axis clockwise from the position of Figure 8 with support ring 12 remaining in the same relative position to gimbal ring 14. Figure 10 similarly shows how the operation of mercury switch 16 mounted on support ring 14 is reversed from the condition of Figure 8 as the gyroscope or gimbal ring 14 is moved counterclockwise approximately 120° about the gimbal axis with support ring 12 remaining in the same relative position to gimbal ring 14. With such a reversal of operation of the control device or mercury switch 16 on the support ring, the respective pitch erection motor not only is rendered inoperative for effecting erection of the gyroscope but acutally energizes motor 15 to cause precession in the wrong direction. The operation of the mercury switch 17 which is attached to the gimbal ring 14 and which controls the roll erection motor 13 is not similarly affected, and the correct set of electrodes is bridged by the mercury regardless of the amount of displacement to cause the roll erection motor to function properly and because such movement is limited to 120° displacement from neutral in either direction as can be seen in Figures 5–10. Hence only the operation of the pitch erection motor 15 can be adversely affected by displacement of the gyroscope rotor more than 90° about the roll axis.

If the rotor of the gyroscope is tilted to any of the possible positions in which the switch 16 causes energization of the pitch erection motor 15 in the wrong direction, that motor will drive the support ring 12 toward a position in which the lug 36 is against one of the stops 37, but the roll erection motor 13 will function normally under the control of switch 17 to cause precession about the roll axis until the mercury moves to the opposite end of the switch 16 to properly energize the pitch erection motor 15.

Another factor affecting erection of the gyroscope is back torque produced by the spinning means 19. When the support ring 12 is in a position so that the spin axis is at right angles to the gimbal axis, the back torque has no effect on the position of the rotor. However, if the spin axis is not normal to the gimbal axis the back torque will have a component, which increases as the angle between the spin axis and gimbal axis is reduced, tending to rotate the gimbal ring. The torque thus applied to the gimbal ring also tends to cause precession about the pitch axis in a direction tending to place the spin axis at right angles to the gimbal axis, but when the response of the switch 16 is reversed, this precessional force is opposed by the pitch erecting motor 15.

If the gyroscope is not tilted about the roll axis to such an extent that the pitch erection switch 16 energizes the pitch erection motor 15 in the wrong direction, as described above, then the back torque will not prevent prompt erection. In this case pitch erection, which is not affected by back torque, will take place promptly at low rotor speed. Then with the rotor axis normal to the gimbal axis the roll erection motor 13 will be effective to erect in that plane. Actually, roll erection will be initiated before pitch erection is completed, due to reduction in the effect of the back torque as the spin axis approaches a position normal to the gimbal axis.

If the switch 16 is reversed, however, erection will be dependent entirely on the roll erection motor 13 which under some conditions will be opposed by the back torque caused by the spinning means 19 to an extent depending on the degree of alignment between the spin axis and gimbal axis, as described above. The spinning means 19 is an electrically energized motor which has a starting torque that normally is much higher than the running torque. The roll erecting motor is designed to provide a predetermined erection rate when the rotor is spinning at normal operating speed and is incapable of overcoming the back torque imposed on the gimbal ring during the early stage of the acceleration period if the angle between the spin axis and gimbal axis is small.

As described above, the spinning means 19 is energized through the load resistor 87 during initial stages of acceleration of the rotor 11 until the cathode 111 of the thermionic tube 101 comes up to emissive temperature. The resistor 87 is selected to limit the acceleration of the rotor 11 to a value such that the effective back torque tending to resist erection about the roll axis is less than the erecting torque supplied by the roll erecting motor 13. In the early stages of acceleration, the rotor is spinning rather slowly so that the available erecting force is able to erect the rotor in a few seconds, whereas if the rotor were allowed to come up to speed before erection could take place, erection would extend over an objectionably long period of time. Use of the resistor 87 in the initial stages of acceleration also prevents too violent erection in the cases where the gyroscope is started from positions in which back torque is applied so as to aid erection.

One position where the power torque of the rotor circuit is detrimental to the erection function of the gyroscope occurs when support ring 12 is displaced counterclockwise from the position shown in Figure 2 toward its limit position and gimbal ring 14 is similarly displaced clockwise from the position shown in Figure 3 toward its limit position and beyond the 90° position from neutral with the operation of the control device or mercury switch 16 mounted on support ring 12 reversed from that of its original angular displacement. The torque applied to gimbal ring 14 by roll erection motor 13 is opposed by the back torque necessary to drive the rotor 11 and is not sufficient to precess gimbal ring 14 toward an upright position. Because the operation of mercury switch 16 is reversed, the pitch erection motor 15 causes a counterclockwise precession of support ring 12 rather than a clockwise precession and no assistance will be given to the erection of the spin axis of the gyroscope or movement of said axis away from the near alignment position with the roll axis. With the decrease in acceleration of the rotor caused by the presence of the load resistor and its energizing circuit, this effect of back torque is reduced to a point where the effect of the roll erection motor 13 is larger than the effect of the rotor's back torque and the gimbal ring 14 will be erected to the point where mercury switch 16 is operating normally. At such time both erection motors will function properly to rapidly erect the rotor to its neutral position. The time delay provided by thermionic tube 101 in the energization of the relay 93 is about 15 seconds which period is sufficient for the erection motor to bring the spin axis of the rotor to a position where both roll and pitch erection motors are effective to erect the gyroscope against the back torque of the motor.

A second or corresponding bad corner to that mentioned above is the condition where rotor 11 or the support ring 12 is displaced clockwise from the position shown in Figure 2 about the pitch axis of the gyroscope and the gimbal ring 14 or the total gyroscope structure is displaced about a roll axis in a counterclockwise direction from the position shown in Figure 3 beyond the 90° displacement point from the neutral position. The back torque of rotor 11 again tends to hold the gyroscope in this position but the reduction in acceleration of rotor 11 due to the resistor 87 permits the roll erection motor to position the gyroscope in the same manner as recited above.

The remaining positions where the rotor is displaced clockwise about the pitch axis and the gimbal ring is displaced counterclockwise about the roll axis beyond the 90° displacement point from the neutral position or where the rotor and support rings are displaced counterclockwise about the pitch axis and the gimbal ring is displaced counterclockwise about the roll axis beyond the 90° displacement point from the neutral position are such that the back torque of rotor 11 does not affect this holding function but rather assists in the erection of the gyroscope. The operation of the gravity control device or mercury switch 16 mounted on support ring 12 is still reversed with respect to its operation for a given displacement from the neutral position, but the roll erection motor 13 is somewhat assisted by the back torque of the rotor 11 to move the spin axis of the gyroscope to a position where the operation of pitch erection motor 15 is in the proper direction. The delay in acceleration of the rotor, while not a help to the erection process here, is not a hindrance since there is still a certain amount of back torque from the rotor present which is applied in a direction to assist the roll erection motor. In choosing the size of the load resistor 87, the assistance or hindrance of the rotor's back torque is compromised to permit effective and rapid acceleration of the gyroscope.

The present apparatus provides for rapid and effective erection of the gyroscope from all positions it might assume upon deenergization. It further permits a widened range of displacements of such a vertical gyroscope from normal operating conditions without adverse starting conditions due to reversal of the operation of the gravity sensitive control devices which are necessary for controlling the vertical gyroscopes.

It will be understood that other types of gravity sensitive switches could be substituted for the mercury switches 16 and 17. For instance, pendulum operated open contact switches could be employed to perform the same function in the same way. Also, it will be understood that the described arrangement for erecting a gyroscope is applicable to any structure where freedom about one axis exceeds 90°, and that the particular roll and pitch axes as described are illustrative only.

In considering this invention it should be kept in mind that the present disclosure is intended to be illustrative only and the scope of the invention is to be determined only by the appended claims.

We claim as our invention:

1. In a three degree of freedom gyroscope having a rotor with a plurality of degrees of freedom and spinning means therefor, means energizing said spinning means to give rigidity to said gyroscope, erection means operative for returning said gyroscope on departure from a normally vertical position, a plurality of gravity sensitive control devices for controlling said erection means one of which reverses in operation beyond given ranges of displacement of said rotor, means mounting said rotor for displacement in excess of said ranges wherein the rigidity of said gyroscope sets up a reaction tending to hold said rotor displaced within said excess of said ranges, and means decreasing the acceleration of said rotor under start conditions to permit one of said erection means to overcome said reaction of said gyroscope and precess said rotor to a position within said ranges of displacement.

2. In a three degree of freedom gyroscope having a rotor with a plurality of degrees of freedom normally operating in a vertical position and spinning means therefor, means energizing said spinning means to give rigidity to said gyroscope, erection means on the roll and pitch axes of said gyroscope and operative to return said rotor to a normal position, gravity sensitive control devices controlling said erection means one of which reverses in operation beyond given ranges of displacement of said rotor, means mounting said gyroscope for displacement relative to said roll and pitch axes in excess of said ranges where the rigidity of said gyroscope sets up a reaction tending to hold said rotor displaced within said excess of said ranges, relay means, time delay means controlling the energization of said relay means, means controlled by said relay means for limiting the power to said spinning means, said power limiting means operating to decrease the rotor acceleration during starting operation, and one of said erection means being operative to overcome said reaction of said rotor during decreased acceleration to position said rotor and said reversed gravity control device within said ranges of displacement.

3. In a three degree freedom gyroscope having a rotor with a plurality of degrees of freedom and spinning means therefor, erection means for applying torques to said gyroscope for precessing the same into a predetermined position, gravitational type control means for controlling said erection means, one of said erection means being rendered ineffective to precess said gyroscope to said predetermined position when said gyroscope is so displaced on starting that the operation of one of said control means is reversed, and means reducing the acceleration of said rotor during starting operation to permit the other of said erection means to precess said gyroscope to a position where both of said erection means are equally effective.

4. In a three degree of freedom gyroscope having a rotor and spinning means therefor, erection means for applying torques to said gyroscope for precessing the same into a predetermined position, gravitational type control means for controlling said erection means, one of said erection means being rendered ineffective to erect said gyroscope when said rotor is so displaced upon starting that the operation of one of said control means is reversed, and means automatically effective during starting of the gyroscope for preventing rapid acceleration of said rotor to permit the other of said erection means to become operative to precess said gyroscope toward a position where said one of said erection means is rendered effective to erect said gyroscope.

5. In a vertical gyroscope, a rotor and spinning means therefor, means energizing said spinning means for accelerating said rotor upon starting, means mounting said gyroscope for movement relative to a pair of axes which are positioned 90° to the vertical axes and 90° from one another for displacement greater than 90° from said vertical position about one of said axes, and means applying torque to said gyroscope upon displacement for precessing said gyroscope into said vertical position, one of said torque applying means being reversed in operation when said gyroscope is displaced more than 90° from said vertical position about said one of said axes, and means automatically effective during starting for preventing rapid acceleration of said rotor to permit the other of said torque applying means to precess said gyroscope toward said vertical position.

6. In a vertical gyroscope, a rotor and spinning means therefor, means energizing said spinning means for accelerating said rotor, means mounting said rotor and said spinning means in a normally vertical position for displacement relative to a pitch and roll axes, a first erection means mounted concentric with said pitch axis of said gyroscope, a first control device responsive to displacement of said rotor about said roll axis for controlling said first erection means to cause precession of said rotor about said roll axis, a second erection means mounted concentric with said roll axis of said gyroscope, a second control device responsive to displacement of said rotor about said pitch axis and attached to said mounting means for controlling said second erection means to cause precession of said rotor about said pitch axis, said mounting means providing for displacement of said rotor and said spinning means about said roll and said pitch axes such that said second control device is displaced to a position where it cannot control the energization of said second erection means to cause precession of said rotor about said pitch axis to said normally vertical position, and means decreasing the acceleration of said rotor during starting conditions to permit rapid operation of said first erection means to precess said rotor about said roll axis and position said second control device in a position where it can control the energization of said second erection means and cause precession of said rotor about said pitch axis to said normally vertical position.

7. In a vertical gyroscope, a rotor mounted for displacement about a pair of perpendicular axes, means for rotating said rotor to give rigidity to said gyroscope, erection means mounted concentric with each of said axes for erecting said rotor to a normal position, a pair of control devices each one of which is responsive to displacement of said rotor from said normal position about one of said pair of axes for controlling one of said erection means located on the opposite axis to erect said rotor about the axis in which said control device responds to displacement, means mounting one of said control devices on said gyroscope to permit displacement thereof upon starting to a position where it is ineffective to control its associated erection means to erect said rotor to said normal position, and means operative upon starting of said gyroscope to retard the rotation of said rotor and permit the other of said erection means to rapidly erect said rotor to a position where both of said erection means are equally effective to erect said rotor to said normal position.

8. In a three degree of freedom gyroscope having a rotor with a normally vertical spin axis and spinning means therefor, erection means operable for returning said gyroscope on departure from said normally vertical position, gravitational type control means for controlling said erection means, energizing circuit means for said spinning means to accelerate said rotor, means for retarding the acceleration of said rotor including a resistor and relay means adapted to selectively insert or remove said resistor from said spinning means energizing circuit, and thermionic tube means for controlling the operation of said relay to provide for time delay in the operation of said relay.

9. In a three degree of freedom gyroscope having a rotor with a normally vertical spin axis and spinning means therefor, erection means operative for returning said gyroscope on departure from said normally vertical position, gravitational type control means for controlling said erection means, energizing circuit means for said spinning means to accelerate said rotor, means for retarding said acceleration of said rotor including a resistor and relay means, said relay means being adapted to selectively insert or remove said resistor from said energizing circuit of said spinning means, and time delay means for controlling the operation of said relay means to limit the time of operation of said retarding means.

10. In a three degree of freedom gyroscope having a rotor and spinning means therefor, erection means for applying a torque to said gyroscope for precessing the same into a predetermined position, means energizing said spinning means to accelerate said rotor, means including a relay means for retarding said acceleration of said spinning means, and time delay means for controlling said relay means to operate said retarding means.

11. In a device of the class described, in combination, a rotor having a spin axis in a normally predetermined position, spinning means for said rotor, precessing means automatically operable for returning said rotor of said gyroscope to said predetermined position upon departure therefrom, an electrical energizing circuit means for said spinning means to accelerate said rotor, means for delaying full energization of said spinning means, and time delay means for controlling the operation of said delaying means to provide for time delay in the operation of said energization delaying means.

12. In a gyroscope, a rotor, means mounting said rotor for rotation about a spin axis in a predetermined position and for displacement about a pair of mutually perpendicular axes, precessing means for applying torque to said gyroscope rotor for returning it to said predetermined position upon departure therefrom, electrical energizing circuit means for said spinning means to accelerate said rotor, means for retarding the acceleration of said rotor including an impedance means and switching means adapted to selectively insert or remove said impedance means from said energizing circuit, and time delay means for controlling the operation of said switching means to provide for time delay in the operation of said switching means.

JOHN F. SCHOEPPEL.
WAYNE A. STONE.

REFERENCES CITED

The following references are of record in the file of this patent:

UNITED STATES PATENTS

| Number | Name | Date |
|---|---|---|
| 1,558,720 | Thompson | Oct. 27, 1925 |
| 2,161,241 | Bates | June 6, 1939 |
| 2,278,913 | Carter | Apr. 7, 1942 |
| 2,315,167 | Von Manteuffel et al. | Mar. 30, 1943 |
| 2,367,465 | Kunzer | Jan. 16, 1945 |
| 2,368,644 | Curry | Feb. 6, 1945 |